(12) United States Patent
Li et al.

(10) Patent No.: US 12,223,032 B2
(45) Date of Patent: Feb. 11, 2025

(54) PASSWORD PROTECTION METHOD AND APPARATUS, AND MEDIUM

(71) Applicant: SUZHOU METABRAIN INTELLIGENT TECHNOLOGY CO., LTD., Jiangsu (CN)

(72) Inventors: Dengwei Li, Jiangsu (CN); Rengang Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/565,035

(22) PCT Filed: Apr. 26, 2022

(86) PCT No.: PCT/CN2022/089351
§ 371 (c)(1),
(2) Date: Nov. 28, 2023

(87) PCT Pub. No.: WO2023/071100
PCT Pub. Date: May 4, 2023

(65) Prior Publication Data
US 2024/0265093 A1 Aug. 8, 2024

(30) Foreign Application Priority Data
Oct. 26, 2021 (CN) .......................... 202111244197.X (51) Int. Cl.
*G06F 21/46* (2013.01)
*G06F 21/31* (2013.01)
(52) U.S. Cl.
CPC .............. *G06F 21/46* (2013.01); *G06F 21/31* (2013.01)

(58) Field of Classification Search
CPC .................................. G06F 21/46; G06F 21/31
See application file for complete search history.

(56) References Cited

U.S. PATENT DOCUMENTS

| | | | | |
|---|---|---|---|---|
| 2019/0286824 A1* | 9/2019 | Aizawa | .................... | G06F 21/44 |
| 2019/0349351 A1* | 11/2019 | Verma | ..................... | H04L 63/30 |

(Continued)

FOREIGN PATENT DOCUMENTS

| | | | |
|---|---|---|---|
| CN | 105468962 A | 4/2016 |
| CN | 106780895 A | 5/2017 |

(Continued)

*Primary Examiner* — James R Turchen
(74) *Attorney, Agent, or Firm* — IPro, PLLC (57) ABSTRACT

The present application discloses a password protection method. Aiming at the current problem that, when a plurality of passwords are used, the plurality of passwords may be invalidated after one password is compromised, a password protection method is provided, which comprises: after password authentication is successful, determining, according to a password currently passing the authentication, a specified bit of password invalidation enable identifiers stored in a storage medium, wherein there is only one specified bit because there is only one authenticated password; setting the specified bit to be in an allowed state and other bits to be in a non-allowed state, wherein the password invalidation enable identifiers are in one-to-one correspondence with passwords according to bits, and only when one bit of the password invalidation enable identifiers is in the allowed state, an invalidation operation on the passwords is allowed; determining whether a password invalidation request is received; and if a password invalidation request is received, performing invalidation operation on the password corresponding to the specified bit.

19 Claims, 3 Drawing Sheets

(56) References Cited

U.S. PATENT DOCUMENTS

| | | | | |
|---|---|---|---|---|
| 2020/0151323 A1* | 5/2020 | Kras | ................ | G06F 21/577 |
| 2020/0304544 A1* | 9/2020 | Vasanthapuram | .... | G06F 16/953 |
| 2021/0367934 A1* | 11/2021 | Nair | ................ | H04L 9/0643 |
| 2024/0232394 A1* | 7/2024 | Puzic | ................ | G06F 21/604 |

FOREIGN PATENT DOCUMENTS

| | | |
|---|---|---|
| CN | 106789079 A | 5/2017 |
| CN | 107547610 A | 1/2018 |
| CN | 107730676 A | 2/2018 |
| CN | 112613020 A | 4/2021 |
| CN | 113158172 A | 7/2021 |
| CN | 113688380 A | 11/2021 |
| WO | 2016202795 A1 | 12/2016 |

* cited by examiner

PASSWORD PROTECTION METHOD AND APPARATUS, AND MEDIUM

CROSS REFERENCE TO RELEVANT APPLICATIONS

The present application claims the priority of the Chinese patent application filed on Oct. 26, 2021 before the Chinese Patent Office with the application number of 202111244197.X and the title of "PASSWORD PROTECTION METHOD, APPARATUS AND MEDIUM", which is incorporated herein in its entirety by reference.

TECHNICAL FIELD

The present application relates to the field of design and application of integrated circuits and more particularly, to a password protection method and device, and a medium.

BACKGROUND

In the practical production and life, in order to ensure the safety, generally passwords are provided in chips of some electronic apparatuses that need them. The apparatus is capable to be started up or performed other operations merely after a password authentication is passed. Moreover, in order to prevent a single password from being easily cracked and, after the single password is cracked, the apparatus is no longer safe, at present, multiple passwords or a root password are usually used to solve the problem.

In recent years, currently the problem of a single password is usually solved by means of adding multiple passwords or a root password. However, when multiple passwords are used, the multi-password invalidation mechanism does not take into consideration the case in which the multiple passwords are invalidated at one time, causing the problem that, once one of the passwords is cracked, all of the passwords may be invalidated, which results in the failure of the chip and the system.

SUMMARY

The present application provides a password protection method, among them the method is applied to a password protection apparatus including a storage medium, and includes:
  after a password authentication is passed, according to a password that is currently authenticated, determining a specified bit of an enabling identifier of password invalidation, among them the enabling identifier of password-invalidation is stored in the storage medium, and is configured for representing whether an invalidation operation is permitted to be performed to the password;
  setting the specified bit of the enabling identifier of password invalidation to be in a permitting state, and setting other bits to be in a non-permitting state, among them the enabling identifier of password invalidation is in one-to-one correspondence with each of the passwords according to bits, and merely when one of the bits of the enabling identifier of password invalidation is in the permitting state, the invalidation operation is permitted to be performed to the password; and
  after an invalidation request of the password is received, performing the invalidation operation to the password corresponding to the specified bit.

In some embodiments, an available password that is capable of passing the password authentication is unique in one time of the password authentication, the available password is determined by a password state identifier, and states of different bits of the password state identifier indicate whether different instances of the passwords are invalid or not, respectively.

In some embodiments, the password state identifier is saved in a one-time programmable read-only memory.

In some embodiments, the method further includes:
  when all of the passwords are invalid, entering a locking state, to forbid an external input from operating.

In some embodiments, the password protection method further includes:
  when entering the locking state, playing a prompt message.

In some embodiments, the password protection method further includes:
  after the password is reconfigured and the one-time programmable read-only memory storing the corresponding password state identifier is replaced, releasing the locking state.

The present application further provides a password protection device, among them the password protection device includes a storage medium and a controller:
  the storage medium is connected to the controller, and the controller is configured for, after a password authentication is passed, according to a password that is currently authenticated, determining a specified bit of the enabling identifier of password invalidation;
  setting the specified bit of the enabling identifier of password invalidation to be in a permitting state, and setting other bits to be in a non-permitting state, among them the enabling identifier of password invalidation is in one-to-one correspondence with each of the passwords according to bits, and merely when one of the bits of the enabling identifier of password invalidation is in the permitting state, the invalidation operation is permitted to be performed to the password;
  judging whether an invalidation request of the password is received; and
  after the invalidation request of the password is received, performing the invalidation operation to the password that corresponds to the specified bit.

The present application further provides a password protection apparatus, among them the apparatus includes:
  a determination module configured for, after a password authentication is passed, according to a password that is currently authenticated, determining a specified bit of an enabling identifier of password invalidation;
  a bit setting module configured for, setting the specified bit of the enabling identifier of password invalidation to be in a permitting state, and setting other bits to be in a non-permitting state, among them the enabling identifier of password invalidation is in one-to-one correspondence with each of the passwords according to bits, and merely when one of the bits of the enabling identifier of password invalidation is in the permitting state, the invalidation operation is permitted to be performed to the password; and
  an invalidation module configured for, after an invalidation request of the password is received, performing the invalidation operation to the password that corresponds to the specified bit.

In some embodiments, the password protection apparatus further includes:

a locking module configured for, when all of the passwords are invalid, entering a locking state, to forbid an external input from operating.

In some embodiments, the password protection apparatus further includes:

a prompting module configured for, when entering the locking state, playing a prompt message.

In some embodiments, the password protection apparatus further includes:

an unlocking module configured for, after the password has been is reconfigured and the one-time programmable read-only memory storing the corresponding password state identifier is replaced, releasing the locking state.

An embodiment of the present application further provides a password protection device, among them the device includes a memory and one or more processors, the memory stores a computer-readable instruction, and when the computer-readable instruction is executed by the one or more processors, making the one or more processors implement the steps of the password protection method according to any one of the above-mentioned embodiments.

An embodiment of the present application further provides one or more non-transitory computer-readable storage mediums storing a computer-readable instruction, among them when the computer-readable instruction is executed by one or more processors, making the one or more processors implement the steps of the password protection method according to any one of the above-mentioned embodiments.

The details of one or more embodiments of the present application are provided in the following drawings and description. The other characteristics and advantages of the present application will become apparent from the description, the drawings and the claims.

BRIEF DESCRIPTION OF THE DRAWINGS

In order to more clearly illustrate the embodiments of the present application, the figures that are required to describe the embodiments will be briefly described below. Apparently, the figures that are described below are merely embodiments of the present application, and a person skilled in the art can obtain other figures according to these figures without paying creative work.

DETAILED DESCRIPTION

The technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work will fall within the protection scope of the present application.

The core of the present application is to provide a password protection method, device and medium.

In order to enable a person skilled in the art to better comprehend the solutions of the present application, the present application will be further described in detail below with reference to the drawings and the embodiments.

Figure 1:
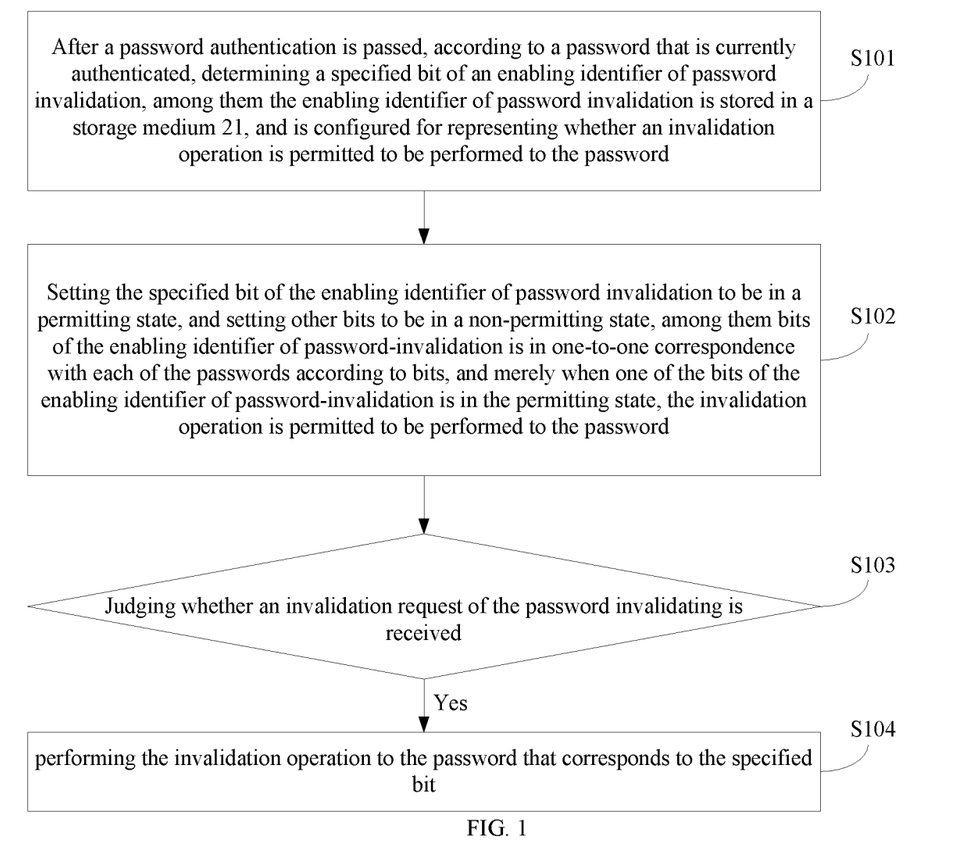
FIG. 1 is a flow chart of a password protection method according to one or more embodiments of the present application.

In a practical engineering application, in consideration of ensuring the safety, a password is provided in an apparatus that is relatively important or serves for controlling, and merely after a user inputs a password correctly, a corresponding permission is obtained to operate the apparatus. However, if merely one password exists, the password is easily attacked and cracked by a law breaker, which makes the apparatus is no longer safe. In order to solve the problem of a single password, at present, multiple passwords or a root password are usually used at present. In the use of the multiple passwords, when an operator considers that a certain password is no longer safe, an invalidation operation is performed to that password, and the invalidated password is not passed in a next time of password authentication. However, the current multi-password invalidation mechanism does not take into consideration the case in which the multiple passwords are invalidated at one time, and after one of the passwords is cracked by a lawbreaker, all of the passwords are invalidated, which causes the device is no longer safe or unable to be used. Consequently, as shown in FIG. 1, the present application provides a password protection method, the method includes:

S101: After a password authentication is passed, according to a password that is currently authenticated, determining a specified bit of an enabling identifier of password invalidation, among them the enabling identifier of password invalidation is stored in a storage medium 21, and is configured for representing whether an invalidation operation is permitted to be performed to the password.

S102: Setting the specified bit of the enabling identifier of password invalidation to be in a permitting state, and setting other bits to be in a non-permitting state, among them bits of the enabling identifier of password-invalidation is in one-to-one correspondence with each of the passwords according to bits, and merely when one of the bits of the enabling identifier of password-invalidation is in the permitting state, the invalidation operation is permitted to be performed to the password.

S103: Judging whether an invalidation request of the password invalidating is received.

S104: After the invalidation request of the password is received, performing the invalidation operation to the password that corresponds to the specified bit.

In the present embodiment, based on the determination result, determining that the invalidation request of the password is received. Based on the determination that the invalidation request of the password is received, the invalidation operation is performed to the password that corresponds to the specified bit.

In the password protection method according to the present application, after the password authentication is passed, setting every bit of the enabling identifier of password invalidation corresponding to the different passwords one-to-one, to set the bit of the enabling identifier of password invalidation that corresponds to the password that passed the authentication to be in the permitting state, and set other bits to be in the non-permitting state. Furthermore, merely when one bit of the enabling identifier of password invalidation is in the permitting state, the password corresponding to this bit is performed the invalidation operation. Accordingly, merely one password is invalidated at one time of logging-in, and merely the current password is invalidated, which solves the problem that, after one of the passwords is cracked, all of the passwords is invalidated.

It may be easily understood that the password according to the present application is an encryption method for an apparatus, and it is, in terms of the effect, equivalent to a public key and a private key based on an encryption algorithm, among them the encryption algorithm includes but is not limited to the RSA algorithm.

Regarding the RSA algorithm, the RSA public key cryptosystem is a cryptosystem that, by using different encryption keys and decryption keys, and deriving, by a known encryption key, a decryption key is computationally unfeasible. The RSA is also the public-key algorithm that is most extensively studied. It has been nearly thirty years since it was put forward, and it has been tested by various attacks, and gradually accepted by people. It is generally considered as one of the best public key solutions at present.

In the present embodiment, the device pre-stores multiple passwords. These passwords correspond to the different bits of the enabling identifier of password invalidation, and merely when the corresponding bit of the enabling identifier of password invalidation is in the permitting state, this password is performed the invalidation operation. Furthermore, after every time that the authentication is passed, it is not necessarily required to invalidate a certain password. If an operator considers that the password is still safe, it is not required to perform the password invalidation operation. After the next password authentication, the operator decides whether it is required to perform the invalidation operation to the password.

Moreover, the quantity of the passwords that pass the authentication in one time of the password authentication is not limited in the present embodiment, and it may be one password, and may also be multiple passwords. The password that cannot pass the authentication may be a password that is invalidated, and may also be a password that is not invalidated but is unavailable in this time of authentication, among them the judgement logic of the password authentication may be decided freely according to the practical requirements.

In the password protection method according to the present embodiment, after the password authentication is passed, the enabling identifier of password invalidation is set, to set merely the specified bit therein corresponding to the password that passed the password authentication this time to be in the permitting state, and set all of the other bits to be in the non-permitting state. In other words, if, at this point, an operator performs an invalidation operation to the passwords, merely one of the passwords is invalidated, the safety of the apparatus is further ensured. Moreover, the invalidated password is a password that passed the current password authentication. After a lawbreaker attacks and cracks a certain password, all of the passwords cannot be invalidated to cause the device to be unable to normally operate, merely the current password is invalidated. Furthermore, since the current password is cracked by the law breaker, and it is no longer safe, even though it is invalidated, that does not affect the safety of the apparatus.

Accordingly, it may be known that, when the abovementioned embodiment does not limit that, in the process of the password authentication, the available password that pass the authentication is one password. Therefore, when the available password is multiple passwords, it might be the case that a lawbreaker, after cracking merely one of the available passwords, is capable to pass the authentication and attack the apparatus. Consequently, on the basis of the above-mentioned embodiment, the present embodiment provides a solution, which includes: an available password that is capable of passing the password authentication is unique in one time of the password authentication, and the available password is determined by using a password-state identifier, and states of different bits of the password-state identifier indicate whether different instances of the passwords are invalidated or not.

It may be easily understood that, different bits of the password-state identifier correspond to the passwords one-to-one, and, similarly, correspond to the enabling identifier of password-invalidation one-to-one according to bit. The state of a certain bit of the password state identifier indicates whether the password corresponding thereto is invalidated. For example, in a solution, the password state identifier is a string of binary numbers, among them when the second bit is 1, that indicates that the second password is invalidated, when the third bit is 0, that indicates that the third password is valid, and the rest may be done in the same manner. In addition, the storage position of the password state identifier is not limited in the present embodiment. The password state identifier may be saved in the internal memory of an apparatus, and may also be saved in an external storage medium, which is decided according to practical requirements. When the password state identifier is saved in the internal memory of the apparatus, the internal memory may be the storage medium 21 storing the enabling identifier of password invalidation, as stated in the above-mentioned embodiment, and may also be other internal memory.

Similarly, a solution of the enabling identifier of password invalidation is that the enabling identifier of password invalidation is a string of binary numbers, among them when the second bit is 1, it is permitted to modify the second bit of the password state identifier, that is, the second password is invalidated, and the rest may be done in the same manner. However, the present embodiment does not limit that the implementations of the password state identifier and the enabling identifier of password invalidation should be one of the above-described forms, and they may be decided according to practical requirements.

In addition, in one time of the password authentication, it might be the case that there are multiple passwords that are not invalidated. Since in the password protection method according to the present embodiment, the available password in one time of the password authentication is merely one password, regarding how to determine the available password, the present embodiment provides a solution, which includes: sequentially arranging the passwords, and, according to the sequence of the passwords that are not invalidated, determining a certain password to be the available password of this time of the password authentication. For example, there are eight preset passwords, the eight passwords are arranged sequentially, and the password that was invalidated last time is the third password. Accordingly, before the next time of password invalidation operation is performed, the available password is the next password of the password that was invalidated last time, that is, the fourth password, and the rest may be done in the same manner. Another solution includes: every time the password invalidation operation is performed, specifying that the available password of the next time of password authentication is one of the valid passwords. When invalidation operation is not performed using a preset password in the configuration of all of the passwords as the available password.

The advantage of the present embodiment over the above embodiment lies in that, after one valid password is leaked, if this password is not a currently valid password, this password cannot be used to pass the password authentication, so that the possibility with which the apparatus is attacked and cracked is reduced, and the safety of the password protection method is further improved.

Accordingly, it may be known that, according to the password protection method of the above-mentioned embodiment, a certain password is invalidated by modifying the corresponding bit of the password state identifier. Therefore, modifying a certain bit of the password state identifier from being valid to being invalid is the password invalidation operation, while modifying a certain bit of the password state identifier from being invalid to being valid is the operation of re-validating the invalidated password. The above-mentioned embodiment does not limit that modifying the password state identifier is merely a process from the valid state to the invalid state, but, since once a password is leaked, it is no longer safe, and it is not required to make it to be valid again, so that the above-mentioned embodiment does not describe the process from the invalid state to the valid state. At the same time, when an invalidated password is permitted to be set to be valid again, it might be utilized by a lawbreaker, which threatens the safety of the apparatus. Therefore, the present embodiment provides a solution, which includes: the password state identifier is saved in a one-time programmable read-only memory (One Time Programmable Read-Only Memory, OTP ROM).

The OTP ROM is a one-time programmable ROM. Such a ROM may be programmed one time, after being programmed the data cannot be erased or rewritten, and the data are not lost under powering-down. For example, in the solution described in the above-mentioned embodiment that the password state identifier indicates whether the passwords are invalid or not, when the OTP ROM is not programmed, the data are 0 and after being programmed, the data change into 1.

When the password state identifier is saved in the OTP ROM, the password state identifier of the corresponding bit is programmed merely when a password invalidation operation is performed, so that the corresponding password is invalidated. Furthermore, this password is permanently invalid, and cannot be restored again, unless a new OTP ROM is used and a new password is configured, which prevents the problem that a law breaker restores the invalidated password that is no longer safe, which causes that this password is used to pass the password authentication of the device next time is avoided, and the safety of the device is further improved.

Figure 2:
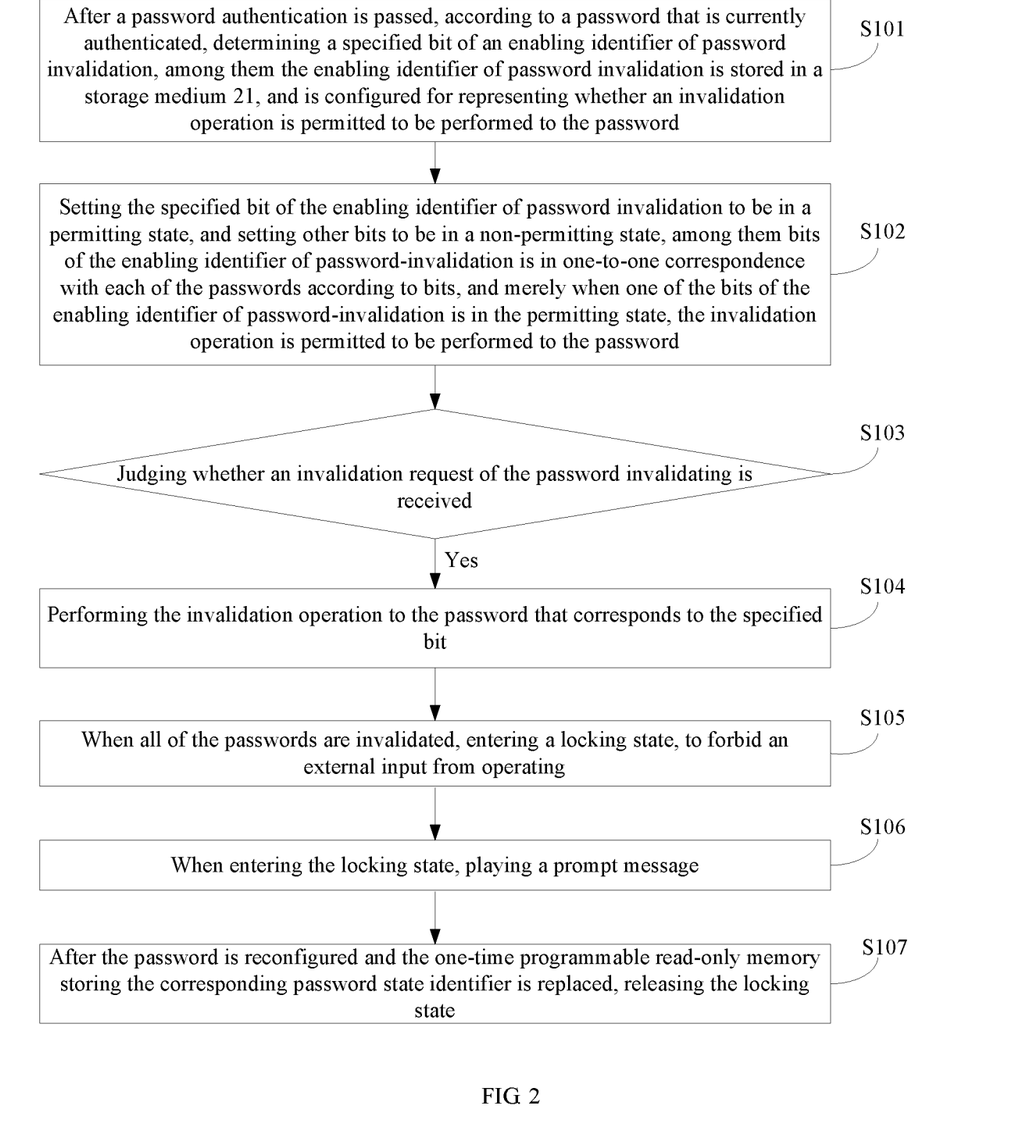
FIG. 2 is a flow chart of another password protection method according to one or more embodiments of the present application.

Since the quantity of the passwords preset into the apparatus in advance is limited, after multiple times of the password invalidation operation, it might be a case that all of the passwords are invalidated, at this point the password protection mechanism of the apparatus is ineffective. Consequently, in view of this, as shown in FIG. 2, the present embodiment provides a password protection method, which includes:

S105: When all of the passwords are invalidated, entering a locking state, to forbid an external input from operating.

After all of the passwords are invalidated, the chip or the other control components of the apparatus enters the locking state, and no longer accepts any operation request from the external input, to avoid data being stolen or performing other operations that cause damage due to the ineffectiveness of the password protection mechanism to the largest extent, so that the safety and the reliability of the apparatus is further improved.

Moreover, when the apparatus enters the locking state, in order to enable an operator to timely know and correspondingly handle it, the present embodiment further provides a solution, which includes:

S106: When entering the locking state, playing a prompt message.

The prompt message according to the present embodiment may be a sound message, and may also be an optical signal, among them the suitable mode may be selected according to the actual requirement. For example, regarding a noisy factory environment, providing the prompt message in the form of the optical signal by adopting an indicator lamp.

When the apparatus enters the locking state, that indicates that the apparatus is in an abnormal state in which the password protection mechanism is ineffective. At this point, playing the prompt message is capable to enable the operator to timely know it and perform the corresponding operation.

In addition, since the apparatus that enters the locking state due to the invalidation of all of the passwords is not damaged itself, and is still capable to run after the locking is released, the present embodiment further provides a solution, which includes:

S107: After the password is reconfigured and the one-time programmable read-only memory storing the corresponding password state identifier is replaced, releasing the locking state.

Accordingly, it may be known that, although the external input is forbidden from operating apparatus after the apparatus enters the locking state, operations on the hardware are still feasible. For example, replacing a register. Furthermore, in the above-mentioned embodiment, a solution is provided that the password state identifier is stored in the OTP ROM. Consequently, after replacing the OTP ROM, the password is recovered to its previous state. However, due to the previous password is no longer safe, it is required to change the password. After the password is replaced, the password protection mechanism of the apparatus is recovered to be normal, the apparatus is continued to be used normally, and so that the locking state of the apparatus is released, the apparatus is not required to be replaced, thereby the cost is saved.

As stated above, after all of the passwords are invalidated, the apparatus enters the locking state, and the prompt message is played to an operator. After the operator checks the problem, the OTP ROM saving the password state identifier is replaced. After the password is reconfigured, the locking state of the apparatus is released. In this way, a complete set of emergency guarding measures that deal with password ineffectiveness is formed, and the safety of the apparatus is further ensured.

In the above-mentioned embodiments, the password protection method is described in detail, and the present application further provides the embodiments corresponding to the password protection device. It should be noted that the present application describes the embodiments of the portion of the device from two perspectives, among them one is a perspective based on the functional module, and the other is a perspective based on the hardware.

Figure 3:
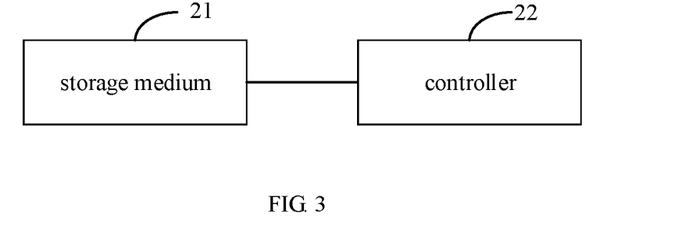
FIG. 3 is a structural diagram of a password protection device according to one or more embodiments of the present application.

FIG. 3 is a structural diagram of the password protection device according to the present application. As shown in FIG. 3, the password protection device includes a storage medium 21 and a controller 22. The storage medium 21 is connected to the controller 22, and is configured for storing an enabling identifier of password invalidation, among them the enabling identifier of password invalidation represents whether an invalidation operation is permitted to be performed to a password. The controller 22 is configured for, after a password authentication is passed, according to the currently authenticated password, determining a specified bit of the enabling identifier of password invalidation: setting the specified bit of the enabling identifier of password invalidation to be in a permitting state, and setting other bits to be in a non-permitting state, among them the enabling identifier of enabling identifier of password-invalidation is in one-to-one correspondence with each of the passwords according to bits, and merely when one of the bits of the enabling identifier of password invalidation is in the permitting state, the invalidation operation is permitted to be performed to the password: judging whether an invalidation request of the password invalidating is received; and after the invalidation request of the password is received, performing the invalidation operation to the password that corresponds to the specified bit.

Figure 4:
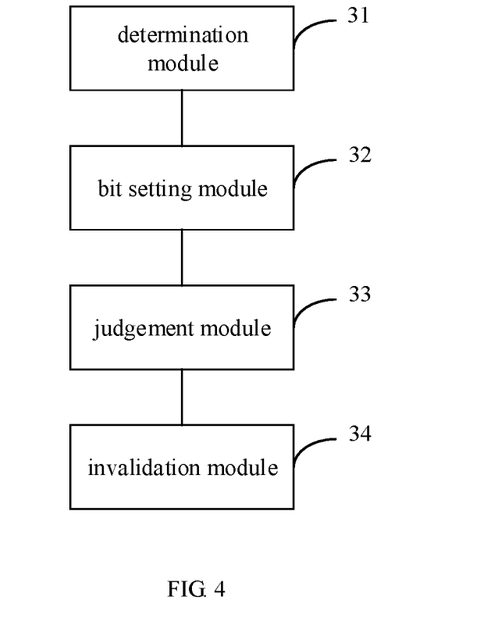
FIG. 4 is a structural diagram of another password protection device according to one or more embodiments of the present application.

FIG. 4 is a structural diagram of another password protection device according to the present application. As shown in FIG. 4, the password protection device includes:

a determination module 31 configured for, after a password authentication is passed, according to the currently authenticated password, determining a specified bit of an enabling identifier of password invalidation, among them the enabling identifier of password invalidation is stored in a storage medium 21, and is configured for representing whether an invalidation operation is permitted to be performed to the password;

a bit setting module 32 configured for, setting the specified bit of the enabling identifier of password invalidation to be in a permitting state, and setting other bits to be in a non-permitting state, among them bits of the enabling identifier of password invalidation is in one-to-one correspondence with each of the passwords according to bits, and merely when one of the bits of the enabling identifier of password invalidation is in the permitting state, the invalidation operation is permitted to be performed to the password;

a judgement module 33 configured for, judging whether an invalidation request of the password is received; and an invalidation module 34 configured for, after an invalidation request of the password is received, performing the invalidation operation to the password that corresponds to the specified bit.

According to an embodiment, the password protection device further includes:

a locking module configured for, when all of the passwords are invalidated, entering a locking state, to forbid an external input from operating.

According to an embodiment, the password protection device further includes:

a prompt module configured for, when entering the locking state, playing a prompt message.

According to an embodiment, the password protection device further includes:

an unlocking module configured for, after the password is reconfigured and the one-time programmable read-only memory storing the corresponding password state identifier is replaced, releasing the locking state.

Since the embodiments of the device and the embodiments of the method correspond to each other, the embodiments of the device please refer to the description of the embodiments of the method, and are not discussed further herein.

The password protection device according to the present embodiment, after all of the passwords are invalidated, entering the locking state, and playing the prompt message to an operator. After the operator checks the problem, the OTP ROM that saving the password state identifier is replaced, and after the password is reconfigured, the locking state of the device is released. Consequently, a complete set of emergency guarding measures that deal with password ineffectiveness is formed, so that the safety of the device is further ensured.

Figure 5:
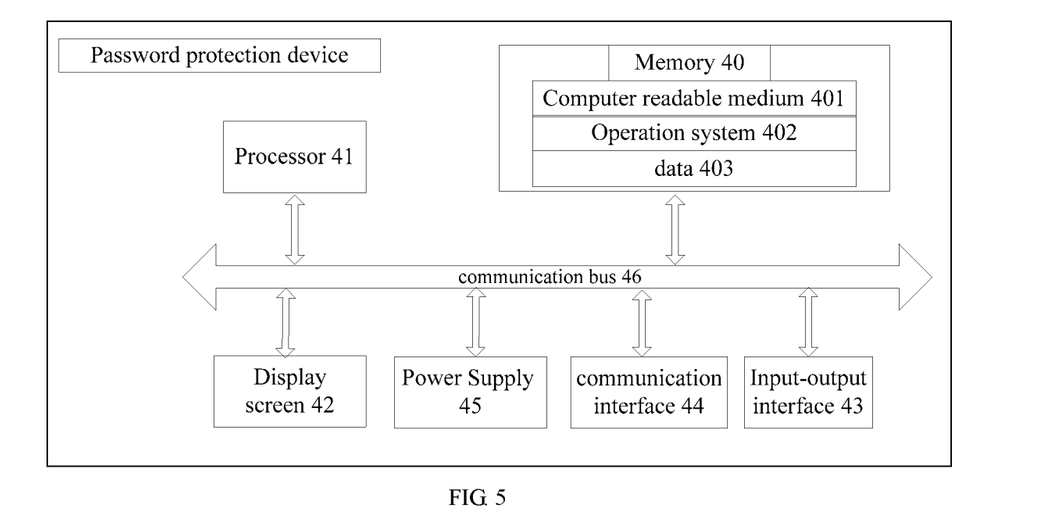
FIG. 5 is a structural diagram of another password protection device according to one or more embodiments of the present application.

As shown in FIG. 5, the present application further provides a password protection device, among them the device includes a memory 40 and one or more processors 41, the memory 40 stores a computer-readable instruction, and when the computer-readable instruction is executed by the one or more processors 41, making the one or more processors 41 implement the steps of the password protection method according to any one of the above-mentioned embodiments.

The memory 40 is configured for, storing a computer-readable instruction. The processor 41 is configured for, when executing the computer-readable instruction, implementing the steps of the password protection method according to the above-mentioned embodiments.

The password protection apparatus according to the present embodiment may include but is not limited to a smartphone, a tablet personal computer, a notebook computer, a desktop computer, and so on.

The processor 41 may include one or more processing cores, for example, a 4-core processor and an 8-core processor. The processor 41 may be implemented in at least one of the hardware forms of Digital Signal Processing (DSP). Field-Programmable Gate Array (FPGA) and Programmable Logic Array (PLA). The processor 41 may also include a host processor and a co-processor. The host processor refers to a processor that processes the data under the awakening state, and is also referred to as a Central Processing Unit (CPU). The co-processor refers to a low power consumption processor that processes the data under the standby state. In some embodiments, the processor 41 may be integrated with a Graphics Processing Unit (GPU), among them the GPU is configured for rendering and drawing the content that a display screen is required to be displayed. In some embodiments, the processor 41 may further include an Artificial Intelligence (AI) processor, among them the AI processor is configured for processing computing operations related to machine learning.

The memory 40 may include one or more computer-readable storage mediums, among them the computer-readable storage mediums may be non-transitory. The memory 40 may further include a high-speed random-access memory and a non-volatile memory, for example, one or more magnetic disk storage apparatuses and flash memory storage apparatuses. In the present embodiment, the memory 40 is at least configured for storing the following computer-readable instruction 401, among them this computer-readable instruction, after loaded and executed by the processor 41, is capable to implement the relevant steps of the password protection method according to any one of the above-mentioned embodiments. Additionally, the resources stored by the memory 40 may further include an operation system 402, data 403 and so on, among them the storage mode may be short-term storage or permanent storage. The operation system 402 may include Windows. Unix, Linux and so on. The data 403 may include but is not limited to the password protection method.

In some embodiments, the password protection device may further include a display screen 42, an input-output interface 43, a communication interface 44, a power supply 45 and a communication bus 46.

A person skilled in the art may understand that the structure shown in FIG. 4 does constitute a limitation on the password protection device, and the device may include components more or fewer than those illustrated.

The password protection device according to the embodiments of the present application includes a memory and a processor, among them the processor, when executing a program stored in the memory, is capable to implement the password protection method.

The password protection device according to the present embodiment is capable to implement the password protection method stated above. After a password authentication is passed, the enabling identifier of password invalidation is set, to set merely the specified bit therein corresponding to the password that passed the password authentication of this time to be in the permitting state, and set all of the other bits to be in the non-permitting state. In other words, at this point, when an operator performs an invalidation operation to the password, merely one of the passwords is invalidated, so that the safety of the apparatus is further ensured. Moreover, the invalidated password is a password that passed the current password authentication, and after a lawbreaker attacks and cracks a certain password, all of the passwords are not capable to be invalidated to cause the apparatus being uncapable of normally running, but merely the current password is invalidated. Furthermore, since the current password is cracked by the law breaker, and it is no longer safe, and even though it is invalidated, that does not affect the safety of the apparatus.

Finally, the present application further provides one or more non-transitory computer-readable storage mediums that storing a computer-readable instruction, among them when the computer-readable instruction is executed by one or more processors, making the one or more processors implement the steps of the password protection method according to any one of the above-mentioned embodiments.

It may be understood that the method according to the above-mentioned embodiments, if implemented in the form of software function units and sold or used as an independent product, may be stored in a computer-readable storage medium. On the basis of such a comprehension, the technical solutions of the present application in essence, or the portion thereof that makes a contribution over the prior art, or the whole or portion of the technical solutions, may be embodied in the form of a software product. This computer software product is stored in a storage medium, and implements all or some of the steps of the methods according to the embodiments of the present application. Moreover, the above-described storage medium 21 includes various media that are capable to store a program code, for example a USB flash disk, a mobile hard disk drive, a Read-Only Memory (ROM), a Random Access Memory (RAM), a diskette and an optical disk and the like.

By using the computer medium storing the password protection method stated above, after the password authentication is passed, the enabling identifier of password invalidation is set, to set merely the specified bit therein corresponding to the password that passed the password authentication of this time to be in the permitting state, and set all of the other bits to be in the non-permitting state. In other words, at this point, when an operator performs an invalidation operation to the password, merely one of the passwords is invalidated, so that the safety of the apparatus is further ensured. Moreover, the invalidated password is a password that passed the current password authentication, and after a law breaker attacks and cracks a certain password, all of the passwords are uncapable to be invalidated to cause the device being unable of normally running, but merely the current password is invalidate. Furthermore, since the current password is cracked by the law breaker, and it is no longer safe, even though it is invalidated, that does not affect the safety of the apparatus.

The password protection method, device and the medium according to the present application are described in detail above. The embodiments of the description are described in the mode of progression, each of the embodiments emphatically describes the differences from the other embodiments, and the same or similar portions of the embodiments may refer to each other. Regarding the devices according to the embodiments, since they correspond to the methods according to the embodiments, they are described simply, and the relevant portions may refer to the description on the methods. It should be noted that, a person skilled in the art may make improvements and modifications on the present application without departing from the principle of the present application, and all of the improvements and modifications fall within the protection scope of the claims of the present application.

It should also be noted that, in the description, relation terms for example first and second are merely intended to distinguish one entity or operation from another entity or operation, and that does not necessarily require or imply that these entities or operations have therebetween any such actual relation or order. Furthermore, the terms "include", "comprise" or any variants thereof are intended to cover non-exclusive inclusions, so that processes, methods, articles or devices that include a series of elements do not merely include these elements, but also include other elements that are not explicitly listed, or include the elements that are inherent to such processes, methods, products or apparatuses. Unless further limitation is set forth, an element defined by the wording "including a . . . " does not exclude additional same element in the process, method, product or apparatus including the element.

The invention claimed is:

1. A password protection method, applied to a password protection device comprising a storage medium, wherein the method comprises:
after a password authentication is passed, according to a password that is currently authenticated, determining a specified bit of an enabling identifier of password invalidation; wherein the enabling identifier of password invalidation is stored in the storage medium, and is configured for representing whether an invalidation operation is permitted to be performed to the password;
setting the specified bit of the enabling identifier of password invalidation to be in a permitting state, and setting other bits to be in a non-permitting state, wherein the enabling identifier of password invalidation is in one-to-one correspondence with each password according to bits, and merely when one of the bits of the enabling identifier of password invalidation is in the permitting state, the invalidation operation is permitted to be performed to the password; and
after an invalidation request of the password is received, performing the invalidation operation to the password corresponding to the specified bit.

2. The password protection method according to claim 1, wherein an available password that is capable of passing the password authentication is unique in one time of the password authentication, the available password is determined by a password state identifier, and states of different bits of the password state identifier indicate whether different passwords are invalid or not, respectively.

3. The password protection method according to claim 2, wherein the password state identifier is a string of binary numbers, wherein when the second bit is 1, that indicates that the second password is invalidated, when the third bit is 0, that indicates that the third password is valid.

4. The password protection method according to claim 2, wherein the password state identifier is saved in the internal memory of an apparatus or an external storage medium.

5. The password protection method according to claim 2, wherein the password state identifier is saved in a one-time programmable read-only memory.

6. The password protection method according to claim 1, wherein the method further comprises: when all passwords are invalid, entering a locking state, to forbid an external input from operating.

7. The password protection method according to claim 6, wherein the method further comprises: when entering the locking state, playing a prompt message.

8. The password protection method according to claim 6, wherein the method further comprises:
after the password is reconfigured and a one-time programmable read-only memory storing the corresponding password state identifier is replaced, releasing the locking state.

9. The password protection method according to claim 8, wherein in a noisy factory environment, the prompt message is provided in the form of an optical signal by adopting an indicator lamp.

10. The password protection method according to claim 1, wherein the password is an encryption method for an apparatus, and it is, in terms of the effect, equivalent to a public key and a private key based on an encryption algorithm.

11. The password protection method according to claim 10, wherein the encryption algorithm comprises an RSA algorithm.

12. The password protection method according to claim 1, wherein after every time that the password authentication is passed, when an operator considers that the password is still safe, it is not required to perform the password invalidation operation; after a next password authentication, the operator decides whether it is required to perform the invalidation operation to the password.

13. The password protection method according to claim 1, wherein a quantity of passwords that pass the authentication in one time of the password authentication comprises one password or multiple passwords.

14. The password protection method according to claim 1, wherein the password that is uncapable to pass the authentication comprises a password that is invalidated and a password that is not invalidated but is unavailable in a current time of authentication.

15. The password protection method according to claim 1, wherein the enabling identifier of password invalidation is a string of binary numbers, wherein when the second bit is 1, it is permitted to modify the second bit of the password state identifier.

16. The password protection method according to claim 1, wherein passwords are sequentially arranged, and, according to the sequence of the passwords that are not invalidated, determining a password to be the available password of current time of the password authentication.

17. A password protection device, wherein the device comprises a memory and one or more processors, the memory stores a computer-readable instruction, and when the computer-readable instruction is executed by the one or more processors, making the one or more processors implement the password protection method according to claim 1.

18. The password protection device according to claim 17, wherein an available password that is capable of passing the password authentication is unique in one time of the password authentication, the available password is determined by a password state identifier, and states of different bits of the password state identifier indicate whether different passwords are invalid or not, respectively.

19. One or more non-transitory computer-readable storage mediums storing a computer-readable instruction, wherein when the computer-readable instruction is executed by one or more processors, making the one or more processors implement the operations comprising:
after a password authentication is passed, according to a password that is currently authenticated, determining a specified bit of an enabling identifier of password invalidation; wherein the enabling identifier of password invalidation is stored in the storage medium, and is configured for representing whether an invalidation operation is permitted to be performed to the password;
setting the specified bit of the enabling identifier of password invalidation to be in a permitting state, and setting other bits to be in a non-permitting state, wherein the enabling identifier of password invalidation is in one-to-one correspondence with each password according to bits, and merely when one of the bits of the enabling identifier of password invalidation is in the permitting state, the invalidation operation is permitted to be performed to the password; and
after an invalidation request of the password is received, performing the invalidation operation to the password corresponding to the specified bit.

* * * * *